United States Patent [19]

Zwaenepoel et al.

[11] 4,367,315

[45] Jan. 4, 1983

[54] FLAME RETARDANT POLYMER SYSTEMS AND POLYMER COMPOSITIONS

[75] Inventors: Paul Zwaenepoel; Guido Strzelbicki, both of Brussels, Belgium; Daniel J. Scharf, East Amherst; George M. Wagner, Lewiston, both of N.Y.

[73] Assignee: Occidental Chemical Corporation, Niagara Falls, N.Y.

[21] Appl. No.: 229,490

[22] Filed: Jan. 29, 1981

[51] Int. Cl.$^3$ .................. C08G 63/18; C08G 63/20
[52] U.S. Cl. .................. 525/169; 523/526; 523/527; 525/48; 525/174; 528/298; 528/299; 528/303
[58] Field of Search .......... 525/289, 305, 308, 169, 525/174, 48; 528/298, 299, 303; 523/526, 527

[56] References Cited

U.S. PATENT DOCUMENTS

| | | | |
|---|---|---|---|
| 2,779,700 | 1/1957 | Robitschek et al. | 528/299 |
| 2,779,701 | 1/1957 | Robitschek et al. | 528/299 |
| 3,196,191 | 7/1965 | Haigh et al. | 528/298 |
| 3,480,600 | 11/1969 | Pumpelly et al. | 526/292.6 |
| 3,607,836 | 9/1971 | Smith | 528/303 |
| 3,755,498 | 8/1973 | Dickason et al. | 525/176 |
| 3,763,644 | 10/1973 | Jackson et al. | 428/359 |
| 4,032,509 | 6/1977 | Lee | 260/45.75 B |
| 4,051,311 | 9/1977 | Lee | 525/122 |
| 4,175,072 | 11/1979 | Parr et al. | 528/303 |

*Primary Examiner*—Ronald W. Griffin
*Attorney, Agent, or Firm*—James F. Tao; William G. Gosz

[57] ABSTRACT

An improved fire retardant polyester polymer system and composition comprising an interpolymer of a reaction product of hexachlorocyclopentadiene, a polyhydric alcohol, a carboxylic acid containing aliphatic carbon-to-carbon unsaturation, a styrene-type monomer, maleic acid or anhydride and a copolymerizable brominated neopentylacrylate comonomer.

13 Claims, No Drawings

FLAME RETARDANT POLYMER SYSTEMS AND POLYMER COMPOSITIONS

BACKGROUND OF THE INVENTION AND PRIOR ART

The present invention relates to flame retardant polymer systems and to polymerized compositions comprised of an interpolymer of a reaction product of a hexahalocyclopentadiene, a polyhydric alcohol, a polycarboxylic acid containing aliphatic carbon-to-carbon unsaturation, a styrene-type monomer, maleic acid or anhydride and a copolymerizable brominated comonomer, such as a brominated neopentyl acrylate.

The present polymer systems are useful in the preparation of articles of commerce fabricated of polyester resin polymers which are cast, molded or laminated. The present polymer systems are particularly adapted to the preparation of transparent or translucent laminates containing fillers, such as glass, used in the construction transport and other industries.

The standards of flame retardancy for such articles have steadily increased over the years in steadily increasing increments. This is presently accented by the increasing number of laws and regulations relating to flame retardant properties of polymers used in industry and especially those used in the construction industry. Many polymer compositions previously considered to be flame retardant and useful in industry do not meet the standards of today or the improved standards which are almost certain to be set in the future. Thus, flame retardant resin compositions developed at this point in time must not only meet today's standards but must meet higher standards to be viable in the marketplace. In addition to improved flame retardant standards, other properties, such as strength and transparency, are continuously improving, and a product, to be commercially competitive, must be as good as, or better than, the flame retardant polymer compositions available today. The present flame retardant systems and polymers fulfill these criteria.

The present invention relates to polymer systems, that is, polymerizable mixtures of components, and also to polymerized compositions of such systems in their finally reacted form as insoluble, infusible compositions.

It has previously been proposed to add materials with known flame retardant properties to polymer systems to increase flame retardancy of the system. However, many additives adversely affect the physical properties of the final polymer compositions, such as strength or transparency, or have a detrimental effect on the gelling or curing conditions of the polymer system. Further, obtaining a good distribution of dispersion of such additives through the polymer system is most difficult. The present interpolymerizable systems and polymerized compositions are characterized by good compatibility of reactable moieties having flame retardant properties throughout the mixture and by high strength obtained from interpolymerization of the components.

Polyester polymer systems and compositions containing adducts of hexahalocyclopentadiene are known in the art and are more fully described in U.S. Pat. Nos. 2,779,700 and 2,779,701, the teachings of which are hereby incorporated by reference.

Briefly, the hexahalocyclopentadiene component may be a chloro, bromo or fluoro substituted cyclopentadiene wherein all of the hydrogens are replaced by a halogen. Hexachlorocyclopentadiene is presently the most economic and readily available hexahalocyclopentadiene and, hence, is preferred in the present invention. The hexahalocyclopentadiene component is utilized in the form of an adduct which is capable of being esterified with a polyhydric alcohol or a polycarboxylic acid. More preferably, the adduct is the reaction product of hexachlorocyclopentadiene and maleic acid or anhydride to produce 1,4,5,6,7,7-hexachlorobicyclo-(2.2.1)-5-heptene-2,3-dicarboxylic acid or anhydride. Such compounds are sometimes referred to as chlorendic acid or anhydride and may be so referred to hereinafter in the present specification.

The polymer compositions of the present invention may be prepared by conventional mass or solution polymerization techniques.

The use of brominated neopentylacrylates in styrene or acrylonitride based resins to impart flame retardancy are disclosed in U.S. Pat. Nos. 3,480,600; 3,755,498; 3,763,644; 4,032,509; and 4,051,311. However, none of such patents teach the use of an interpolymer containing a reactive adduct of a hexahalocyclopentadiene which is characteristic of the present polymer systems compositions.

SUMMARY OF THE INVENTION

The present polyester resin systems are interpolymerizable mixtures comprised of a reactive adduct of a hexahalocyclopentadiene with maleic acid or anhydride, a polyhydric alcohol component, a polycarboxylic acid or anhydride component, a maleic or halomaleic acid or anhydride, a styrene-type component and a brominated neopentylacrylate selected from the group of mono, di or tribromoneopentylacrylate. The present polyester systems may be polymerized by conventional techniques to produce finally reacted insoluble, infusible materials. The present systems and polymerized compositions are particularly adapted to be admixed with a filler, such as glass, and fabricated into panels useful in the construction, transport and other industries.

DETAILED DESCRIPTION OF THE INVENTION AND PREFERRED EMBODIMENTS

The various components of the present polyester polymer systems and compositions are described separately below.

The reactive adducts of hexahalocyclopentadiene useful in the present invention, particularly the maleic acid or anhydride adducts, have been described in the foregoing. The preferred adducts are 1,4,5,6,7,7-hexachlorobicyclo-(2.2.1)-5-heptene-2,3-dicarboxylic acid or anhydride. The adducts are generally present in the polyester in amounts between about 10 to about 65 percent by weight.

The polyhydric alcohol component can be aliphatic or alicyclic and can have aliphatic carbon-to-carbon unsaturation, and may have up to 40 carbon atoms. Preferably, the alcohol component contains between about 2 and about 12 carbon atoms. Examples of suitable alcohols are ethylene glycol, diethylene glycol, triethylene glycol, propylene glycol, and includes reactive ethers, such as allyl glyceryl ether, or mixtures of alcohols or alcohols and ethers. The alcohol component is generally present in the polyester in amounts between about 10 and about 30 percent by weight.

The polycarboxylic acid component includes acid anhydrides and may be aliphatic, alicyclic or aromatic providing there is at least some aliphatic carbon-to-carbon unsaturation. The acid component may have up to 40 carbon atoms. Preferably, the acid component contains between about 3 and about 12 carbon atoms. Examples of suitable polycarboxylic acids are maleic, fumaric, itaconic, sebacic or mixtures thereof. The acid component is generally present in the polyester in amounts between about 10 and about 60 percent by weight.

The maleic or fumeric acid or anhydride component is utilized to render the polyester copolymerizable and, if not added as part of the polycarboxylic acid component, is suitably added separately. Generally, the maleic acid component is present in amounts between about 1 and about 40 percent by weight of the polyester.

The brominated neopentylacrylate component is suitably prepared by reacting acrylic or methacrylic acid with a brominated neopentyl glycol or alcohol. Useful brominated neopentylacrylates are monobromo, dibromo or tribromo neopentyl acrylate esters or mixtures thereof and may be mono or diesters. Because of the accelerated activity of the di and tri ester which may alter the gellation rate of the polyester system, it is preferred that the acrylate ester contain more than about 10 percent of the mono ester. The brominated neopentylacrylate component may be added at any point during the processing of the polyester; however, to avoid handling large amounts of materials under various reaction conditions, the brominated neopentylacrylate component is preferably added subsequent to or along with the styrene-type component. The brominated neopentylacrylate component is preferably included in amounts between about 2 and about 25 percent and, more preferably, between about 5 and about 15 percent, by weight of the total weight of the polyester system. At the higher portion of the range, 15 to 25 percent, the styrene-type component may be reduced a proportional amount. Generally, less than about 2 percent by weight of the brominated neopentylacrylate component does not significantly improve the flame retardancy of the final polymerized composition, and amounts over about 25 percent by weight do not produce a polymerized product having clarity and heat distortion properties required or desired in many applications, for example, in the production of laminates used for construction purposes.

The styrene-type component is a monomer and suitably includes styrene, alpha-methylstyrene and halogenated styrenes, such as -o, p- and m-chlorostyrenes. The styrene-type component is generally included in amounts between about 25 and about 40 percent, and, more preferably, between about 30 and about 35 percent, by weight of the total polyester system.

The following examples are presented to illustrate the invention and are not to be interpreted as limiting the invention to the specific embodiments of the examples. Unless otherwise stated, all parts in the examples are parts by weight and all temperatures are in degrees Centigrade.

EXAMPLE I

Fifty-two and eight-tenths parts of ethylene glycol and ninety parts of diethylene glycol were charged into an esterification vessel and blanketed with an inert atmosphere of nitrogen. With agitation the mixture was heated to a temperature between about 80° and 100°. 394.7 Parts of 1,4,5,6,7,7-hexachlorobicyclo-(2.2.1)-5-heptene-2,3-dicarboxylic anhydride was then blended with the glycols. Seventy and eight-tenths parts of maleic anhydride was then added with continuous mixing and the temperature raised to 160° to 170°Water of esterification was removed and the acid number monitored. When an acid number of about 55 was reached, 3.6 parts of tetrahydrofurfuryl alcohol was added. Upon reaching an acid number of about 45, the mixture was allowed to cool and cast into pans under an inert atmosphere. The product was a faintly colored transparent brittle material melting at a temperature above room temperature and below 100° C.

EXAMPLE II

One hundred parts of the cast product of Example I was crushed and added, with agitation, to 30 parts of styrene containing 0.03 parts of hydroquinone and the mixture maintained under an inert atomsphere. A complete dissolving took a period of about 24 hours. The resultant product was a clear, substantially colorless solution having a viscosity of about 30 poises at 25° C. on a Gardner bubble viscometer.

EXAMPLE III

One hundred parts of the solution of Example II was mixed with eight parts of tribromoneopentylacrylate. The tribromoneopentylacrylate product was previously prepared by esterifying tribromoneopentyl alcohol with a stoichiometric amount of acrylic acid to obtain a product having an acid number of about 12, a hydroxyl number of about 34 and containing about 63 percent bromine. Nine and three-tenths parts of trichloroethylphosphate and two parts of methylethyl ketone peroxide as an initiator were added with continuous mixing. Thirty parts of chopped strand glass mat were impregnated with the above composition. The resulting product was then cast as a flat panel about 1 mm thick and was set into a polymerized composition by raising the temperature to about 80° and aging for a period of twelve hours.

EXAMPLE IV

The panel of Example III was tested to determine flame retardancy by the oxygen index test. The oxygen index test is described in *Modern Plastics*, March, 1970, p. 124 (ASTM D 2863-74) and may broadly be described as the minimal volume percent of oxygen in a slowly rising oxygen/nitrogen atomsphere that will sustain a candle-like burning of the resin panel when the panel is ignited at the top. The panel tested was found to have an oxygen index of 33.0, a barcol hardness of 52, a tensile strength of 13,500 psi and a heat distortion temperature of 274° C.

The panel was then examined to determine its coloration and light transmission, both initially and after weathering for a period of 500 hours. The coloration was determined using Hunter "L", "a" and "b" values. On the Hunter "L" scale, 100 is colorless and 0 is black. The panel was found to have an initial Hunter "L" value of 93.6 and after 500 hours of weathering a value of 92.6. The Hunter "a" value is a measure of the amount of yellowness on a negative 100 scale. The "a" value of the panel was found to be initially −2.6 and after weathering −3.0. The Hunter "b" value is a measure of greenness on a scale of 100. The panel was found to have a "b" value of 10.3 initially and after 500 hours of aging a value of 11.7. The percent of light transmission was initially found to be 68 percent and after 500 hours of aging 66 percent.

Example IV is shown in the following table as Example IV. Examples V and VI of the table were conducted in a similar manner except that, in Example V, 10 parts of tribromoneopentylacrylate were utilized in the polyester system and that, in Example VI, a control, no brominated neopentylacrylate component was utilized.

TABLE

|  | EXAMPLES | | |
| --- | --- | --- | --- |
|  | IV | V | VI |
| Parts Resin | 70 | 66 | 68 |
| Parts Glass | 30 | 34 | 32 |
| Oxygen Index | 33.0 | 33.8 | 28.2 |
| Barcol Hardness | 52 | 53 | 51 |
| Tensile Strength psi | 13,500 | 14,300 | 14,700 |
| Heat Distortion °C. | 274 | 270 | 272 |
| Weathering | | | |
| Hunter "L" | | | |
| Initial | 93.6 | 94.2 | 95.0 |
| After 500 hours | 92.6 | 92.5 | 90.4 |
| Hunter "a" | | | |
| Initial | −2.6 | −2.2 | −2.2 |
| After 500 hours | −3.0 | −3.0 | −2.9 |
| Hunter "b" | | | |
| Initial | 10.3 | 8.4 | 7.5 |
| After 500 hours | 11.7 | 11.8 | 13.6 |
| Light Transmission % | | | |
| Initial | 68 | 68 | 70 |
| After 500 hours | 66 | 64 | 56 |

It will be appreciated that the present invention is not limited to the specific details given in the examples and illustrated in the specification and that various modifications may be made by one of ordinary skill in the art without departing from the spirit and scope of the invention.

What is claimed is:

1. A polyester polymer system comprised of an interpolymerizable mixture of
    (a) from about 10 to about 65 percent by weight of a reactive adduct of hexahalocyclopentadiene and maleic acid or anhydride,
    (b) from about 10 to about 30 percent by weight of a polyhydric alcohol component,
    (c) from about 10 to about 60 percent by weight of a polycarboxylic acid or anhydride component containing aliphatic carbon-to-carbon unsaturation,
    (d) from about 2 to about 25 percent by weight of a brominated neopentylacrylate, and
    (e) from about 25 to about 40 percent by weight of a reactive monomer selected from the group consisting of styrene, alpha-methyl styrene, halogenated styrenes, and mixtures thereof.

2. The system of claim 1 wherein the adduct of hexachlorocyclopentadiene is 1,4,5,6,7,7-hexachlorobicyclo-(2.2.1)-5-heptene-2,3-dicarboxylic acid.

3. The system of claim 1 wherein the adduct of hexachlorocyclopentadiene is 1,4,5,6,7,7-hexachlorobicyclo-(2.2.1)-5-heptene-2,3-dicarboxylic anhydride.

4. The system of claim 1 wherein the polyhydric alcohol component is selected from the group of ethylene glycol, diethylene glycol, triethylene glycol, propylene glycol, allyl glyceryl ether, or mixtures thereof.

5. The system of claim 1 wherein the polycarboxylic acid component is selected from the group of maleic, fumaric, itaconic, sebacic acid or anhydride or mixtures thereof.

6. The system of claim 1 wherein the brominated neopentyl acrylate component is selected from the group of mono-, di-, tribromo neopentyl acrylate or mixtures thereof.

7. A polymerized polymer composition comprised of
    (a) from about 10 to about 65 percent by weight of a reactive adduct of hexahalocyclopentadiene and maleic acid or anhydride,
    (b) from about 10 to about 30 percent by weight of a polyhydric alcohol component,
    (c) from about 10 to about 60 percent by weight of a polycarboxylic acid or anhydride component containing aliphatic carbon-to-carbon unsaturation,
    (d) from about 2 to about 25 percent by weight of a brominated neopentylacrylate, and
    (e) from about 25 to about 40 percent by weight of a reactive monomer selected from the group consisting of styrene, alpha-methyl styrene, halogenated styrenes, and mixtures thereof.

8. The composition of claim 7 wherein the adduct of hexachlorocyclopentadiene is 1,4,5,6,7,7-hexachlorobicyclo-(2.2.1)-5-heptene-2,3-dicarboxylic acid.

9. The composition of claim 7 wherein the adduct of hexachlorocyclopentadiene is 1,4,5,6,7,7-hexachlorobicyclo-(2.2.1)-5-heptene 2,3-dicarboxylic anhydride.

10. The composition of claim 7 wherein the polyhydric alcohol component is selected from the group of ethylene glycol, diethylene glycol, triethylene glycol, propylene glycol, allyl glyceryl ether, or mixtures thereof.

11. The composition of claim 7 wherein the polycarboxylic acid component is selected from the group of maleic, fumaric, itaconic, sebacic acid or anhydride or mixtures thereof.

12. The composition of claim 7 wherein the brominated neopentyl acrylate component is selected from the group of mono-, di-, or tribromo neopentyl acrylate or mixtures thereof.

13. A polymerized polymer composition comprised of
    (a) from about 10 to about 65 percent by weight of a reactive adduct of hexahalocyclopentadiene and maleic acid or anhydride,
    (b) from about 10 to about 30 percent by weight of a polyhydric alcohol component,
    (c) from about 10 to about 60 percent by weight of a polycarboxylic acid or anhydride component containing aliphatic carbon-to-carbon unsaturation,
    (d) from about 2 to about 25 percent by weight of tribromo neopentyl acrylate, and
    (e) from about 25 to about 40 percent by weight of a reactive monomer selected from the group consisting of styrene, alpha-methyl styrene, halogenated styrenes, and mixtures thereof.

* * * * *